United States Patent [19]

Tien et al.

[11] Patent Number: 5,034,027

[45] Date of Patent: Jul. 23, 1991

[54] MEMBRANES FORMED FROM RIGID AROMATIC POLYAMIDES

[75] Inventors: Chao-Fong Tien, Macungie; Andrew D. Surnamer; Michael Langsam, both of Allentown, all of Pa.

[73] Assignee: Air Products and Chemicals, Inc., Allentown, Pa.

[21] Appl. No.: 502,584

[22] Filed: Mar. 30, 1990

[51] Int. Cl.$^5$ .................. B01D 53/22; B01D 71/56
[52] U.S. Cl. .......................... 55/16; 55/68; 55/158
[58] Field of Search ............ 55/16, 68, 158; 210/500.38; 528/310, 332

[56] References Cited

U.S. PATENT DOCUMENTS

| Re. 30,351 | 7/1980 | Hoehn et al. | 55/16 |
|---|---|---|---|
| 3,822,202 | 7/1974 | Hoehn | 55/16 |
| 3,899,309 | 8/1975 | Hoehn et al. | 55/16 |
| 4,378,400 | 3/1983 | Makino et al. | 428/220 |
| 4,626,468 | 12/1986 | Sundet | 210/500.38 X |
| 4,705,540 | 11/1987 | Hayes | 55/16 |
| 4,717,393 | 1/1988 | Hayes | 55/16 |
| 4,717,394 | 1/1988 | Hayes | 55/16 |
| 4,772,394 | 9/1988 | Swedo et al. | 55/158 X |
| 4,897,092 | 1/1990 | Burgoyne, Jr. et al. | 55/16 |

FOREIGN PATENT DOCUMENTS

| 0219878 | 4/1987 | European Pat. Off. | 55/158 |
|---|---|---|---|
| 58-092445 | 6/1983 | Japan | 55/158 |
| 63-190607 | 8/1988 | Japan . | |
| 63-278524 | 11/1988 | Japan . | |
| 1-099628 | 4/1989 | Japan | 55/158 |
| 1-194904 | 8/1989 | Japan . | |
| 1-194905 | 8/1989 | Japan . | |

OTHER PUBLICATIONS

Kim et al., "Reverse Permselectivity of $N_2$ Over $CH_4$ in Aromatic Polyimides", J. Appl. Poly. Sci., vol. 34, (1987).

M. Salome, "Prediction of Gas Barrier Properties of High Polymers", Poly. Eng. Sci., vol. 26, p. 1543, (1986).

Primary Examiner—Robert Spitzer
Attorney, Agent, or Firm—Mark L. Rodgers; William F. Marsh; James C. Simmons

[57] ABSTRACT

The present invention is a class of polymeric membranes formed from aromatic polyamides derived from dicarboxylic acid chlorides and cardo diamines having alkyl substituents on all portions ortho to the amine functions. These polyamide membranes exhibit high gas permselectivities and are useful in various gas separation applications.

12 Claims, No Drawings

MEMBRANES FORMED FROM RIGID AROMATIC POLYAMIDES

TECHNICAL FIELD OF THE INVENTION

The present invention relates to polymeric membranes which are useful in gas separation operations.

BACKGROUND OF THE INVENTION

There is a need for improved polymeric materials that are highly permeable, yet may under certain circumstances, provide selective separation of various gas combinations. Such materials would especially be useful in commercial, non-cryogenic gas separation processes.

The commercial application for gas separation devices based on polymeric materials relies, in part, on maximizing the overall gas flux through the membrane. P. H. Kim, et al., J. Appl. Poly. Sci., 34 1761 (1987), reported that the gas flux for a membrane is relatable to the average space between the polymer chains. In addition, they indicated that the density of the polymer is also related to the overall gas flux. The problem, in part, for these commercial applications is to identify polymers with very high flux and with good thermo-mechanical properties. It has generally been observed that to achieve high overall flux requires having a polymer with low chain-chain interactions. This can be exemplified by polymers such as poly(dimethylsiloxane) or poly(4-methyl-1-pentene). These materials have rather high gas flux values. These high flux materials have, because of their low chain-chain interaction, low glass transition temperatures (Tg). As a consequence, these materials require either special processing conditions to build in chemical and physiochemical crosslinking or they can be used only at rather low application temperatures. By contrast, polymers with strong chain-chain interactions have rather high Tg values and have usually exhibited rather low gas flux. U.S. Pat. Nos. 3,822,202 and 3,899,309; U.S. Pat. No. Re 30,351 (1980), disclose a process for separating fluids using a semi-permeable membrane made from polyimides, polyesters or polyamides. The repeating units of the main polymer chain of these membranes are distinguished in that such repeating units have at least one rigid divalent subunit, the two main chain single bonds extending from which are not colinear, is sterically unable to rotate 360° around at least one of these bonds, and has 50% or more of its main chain atoms as members of aromatic rings.

U.S. Pat. No. 4,705,540 discloses a highly permeable aromatic polyimide gas separation membrane and processes for using said membrane. The membrane is an aromatic polyimide membrane in which the phenylenediamines are rigid and are substituted on essentially all of the positions ortho to the amino substituents, and the acid anhydride groups are essentially all attached to rigid aromatic moieties.

U.S. Pat. Nos. 4,717,393 and 4,717,394 disclose polymeric membranes and processes using the membranes for separating components of a gas mixture. The membranes disclosed in both of these patents are semi-flexible, aromatic polyimides, prepared by polycondensation of dianhydrides with phenylenediamines having alkyl substituents on all ortho positions to the amine functions, or with mixtures of other, non-alkylated diamines, some components have substituents on all positions ortho to the amine functions. It is taught that the membranes formed from this class of polyimides exhibit improved environmental stability and gas permeability, due to the optimization of the molecular free volume in the polymer.

U.S. Pat. No. 4,378,400 discloses gas separation membranes formed from aromatic polyimides based upon biphenyltetra-carboxylic dianhydride for separating various gas mixtures. Japanese Patent Applications 1-194904 and 1-194905 disclose gas separation membranes formed from various polyarylates and polyimides respectively.

Japanese Patent Applications 63-190607 and 63-278524 disclose gas separation membranes formed from polyamides. The polyamides disclosed as being useful for such membranes are characterized as having hydrogen at all positions ortho to the amine functions or, alternatively, as having a maximum of only one ortho group to each amine function in the alkylated form. Additionally, both applications limit the o-alkyl group to either methyl or ethyl.

M. Salame in Poly. Eng. Sci., 26 1543 (1986) developed a predictive relationship for oxygen permeability coefficient [(PO$_2$)] and polymer structure. In the publication he demonstrates the group contributions of various structural portions of a polymer to P(O$_2$) values. In particular he indicates the presence of an aromatic group, such as phenyl, in place of a methylene (—CH$_2$—) decreases the P(O$_2$) values for a pair of comparative polymers.

BRIEF SUMMARY OF THE INVENTION

The present invention is a class of improved polyamide membranes and processes for using said membranes to separate one or more components of a gas mixture. The membranes of the present invention are formed from aromatic polyamides derived from dicarboxylic acid chlorides and cardo diamines having alkyl substituents on all positions ortho to the amine functions. The subject membranes exhibit exceptionally high gas permselectivity and are useful in gas separation applications, especially for the separation of oxygen and nitrogen from air.

DETAILED DESCRIPTION OF THE INVENTION

The present invention is a class of polymeric membranes which exhibit high selectivity in gas separation applications, especially for the separation of oxygen from air. The membranes of the present invention are formed from aromatic polyamides derived from aromatic dicarboxylic acid chlorides and cardo diamines having alkyl substituents on all positions ortho to the amine functions. The polyamides from which these membranes are formed can be represented by the structural formula:

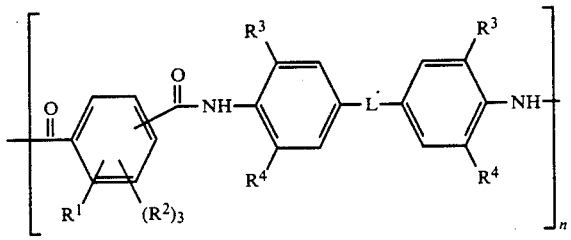

wherein $R^1$ is H or a $C_1$–$C_4$ alkyl group, each $R^2$ is independently H or a methyl group, $R^3$ is a methyl group, $R^4$ is a methyl or isopropyl group, n is an integer greater than 50, and L is a bicyclo bridging group or

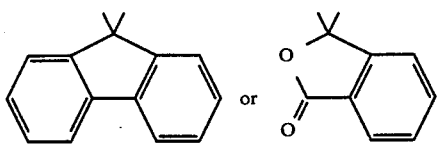

In the instances wherein L is a bicyclo bridging group, such group can be represented by the general structural formula:

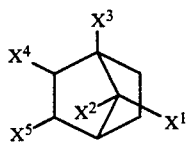

wherein $X^1$, $X^2$, and $X^3$ are independently H or $C_1$–$C_4$ alkyl groups, and $X^4$ and $X^5$ are independently H or a $C_1$–$C_4$ alkyl group or together form a $C_3$–$C_{15}$ cyclic alkyl group to form a fused ring bicyclo bridging group. Specific bicyclo bridging groups include:

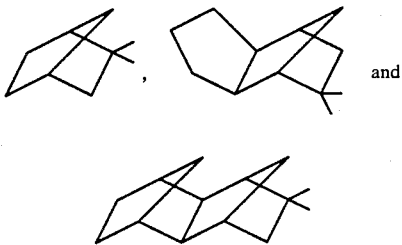

In the above polymer structure, the presence of alkyl substituents on all four positions ortho to the amine functionality sterically restricts free rotation around the amide linkage. It is believed that this rigid intra-molecular conformation may promote greater selectivity for O2 and N2 separation, while the multiple alkyl substituents ortho to the amine along with the cardo moiety prevent the tight packing normally caused by the amide's hydrogen bonding which leads to higher permeability for these membranes. At comparable gas permeabilities, membranes formed from the polyamides disclosed herein exhibit higher gas selectivities ($\alpha$) than the polyamide membranes disclosed in the prior art, such as those disclosed in Japanese Patent Applications 63-278524 and 63-190607. In instances where the selectivities of the present membranes are comparable to those of the prior art membranes, the present membranes are distinguishable in that they exhibit significantly higher gas permeabilities.

In addition to the above polyamide structures, minor amounts of other monomer units may be present which do not affect the gas separation properties of the resultant membranes. The polyamides of the present invention can be used to form membranes in any desired configuration known in the art, such as dense films, flat sheets, hollow fibers, and the like.

As stated above the polyamide membranes of the present invention are useful in a variety of gas separation applications, especially for the recovery of oxygen from an $O_2/N_2$ stream or from air. The gas mixture to be separated is simply brought into contact with the membrane whereby one or more components selectively permeates through the membrane.

The following examples are presented to better illustrate the present invention and are not meant to be limiting.

EXAMPLE I

Thin film polyamide membranes were made in accordance with the procedure set out below. These polyamide membranes had the general structural formula:

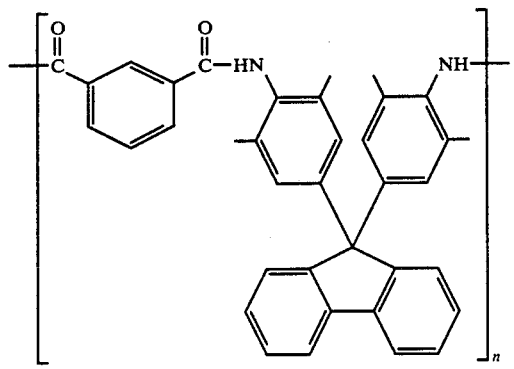

A four neck 500 ml reaction kettle, equipped with a mechanical stirrer, $N_2$ inlet, and glass funnel, is charged with 9.9632 grams (0.025 moles) of 9,9-bis(2,6-dimethyl-1-aminophenyl)fluorene and 50 ml of dimethylacetamide. The solution is heated, under nitrogen, until the monomer dissolves. To the stirring solution 10 ml of pyridine and 5 grams (0.025 moles) of isophthaloyl dichloride is added. An additional 25 grams of dimethylacetamide is added. The resultant clear, yellow solution rapidly increases in viscosity during the first five minutes. The solution is heated to at least 80° C. for three hours.

The polymer is worked up by precipitating it in water. The polymer is then redissolved in dimethylacetamide (heating of the solution is required) and reprecipitated again into water. The polymer is then redissolved and reprecipitated in methanol twice. The resulting white powder is dried under vacuum at 80° C. for twenty-four hours. One typical batch of polymer was found to have an intrinsic viscosity of 0.376 at 25° C. in dimethylacetamide and a Tg of 436.57° C.

A 10% polymer solution is prepared in dimethylacetamide. The solution needs to be heated in order for the powder to dissolve. The solution is then filtered through a 10 micron filter to remove particulates. The film is cast on a glass plate. Approximately 20 grams of solution is poured onto the glass plate in a 110 cm glass ring. The plate is then put into a vacuum oven set at 70° C. for twenty-four hours. The film is removed from the plate and put into another vacuum oven set at 250° for forty-eight hours. The dried film is kept in a desiccator until it is mounted in a permeation cell.

The dried film is placed into a Dow Permeability Cell. A vacuum is pulled on one side and a nitrogen head is on the other. After at least three days of equilibrating the nitrogen permeability measurement is taken. The system is then purged with oxygen and allowed to equilibrate again before taking the oxygen measurement. The results are as follows:

$P(O_2) = 3.10$

P(N$_2$)=0.46
αO$_2$/N$_2$=6.79.

EXAMPLE II

Membranes in accordance with the present invention were synthesized which have the general structural formula:

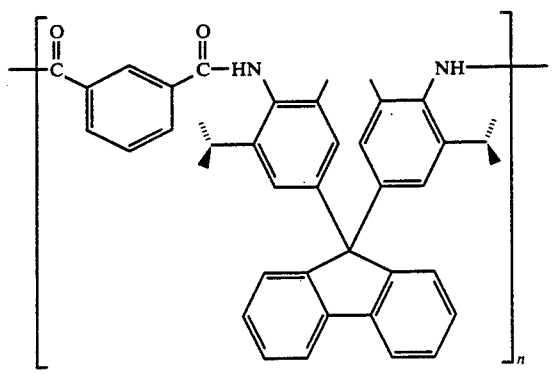

In an apparatus similar to Example I, the flask is charged with 10 grams (0.022 moles) of 9,9-bis(2-methyl-6-isopropyl-1-aminophenyl)fluorene and 50 ml of dimethylacetamide. The stirring solution is heated under nitrogen, until all of the monomer is dissolved. To the stirring solution 5 ml of pyridine and 4.407 grams (0.022 moles) of isophthaloyl dichloride is added. Another 25 ml of dimethylacetamide is added. The clear, pale yellow solution's viscosity rapidly increases within the first five minutes. The solution is allowed to stir at 60° C. for three hours.

The polymer is worked up the same as in Example I, precipitating twice in water and twice in methanol. A typical example of the polymer was found to have an intrinsic viscosity of 0.611 at 25° C. in dimethylacetamide and a Tg of 279.7° C.

A 10% polymer solution is prepared in dimethylacetamide. The solution needs to be heated in order for the powder to dissolve. The solution is then filtered through a 10 micron filter to remove and particulate. The film is cast on a glass plate. Approximately 20 grams of solution is poured onto the glass plate in a 110 cm glass ring. The plate is then put into a vacuum oven set at 70° C. for twenty-four hours. The film is removed from the plate and put into another vacuum oven set at 250° for forty-eight hours. The dried film is kept in a desiccator until it is mounted in a permeation cell.

The dried film is placed into a Dow Permeability Cell. A vacuum is pulled on one side and a nitrogen head is on the other. After at least three days of equilibrating the nitrogen permeability measurement is taken. The system is then purged with oxygen and allowed to equilibrate again before taking the oxygen measurement. The results are as follows:
P(O$_2$)=2.16
P(N$_2$)=0.30
αO$_2$/N$_2$=7.26.

EXAMPLE III

Polyamide membranes in accordance with the present invention were synthesized which have the general structural formula:

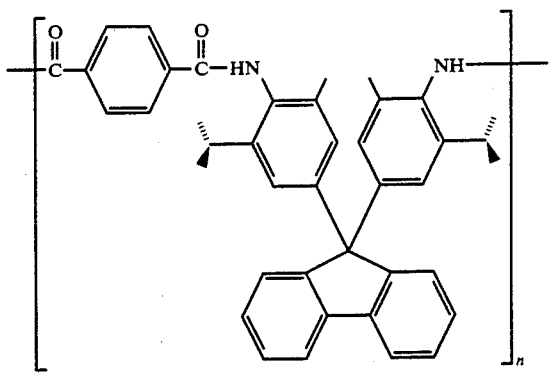

In an apparatus similar to Example I, the flask is charged with 10 grams (0.022 moles) of 9,9-bis(2-methyl-6-isopropyl-1-aminophenyl)fluorene and 50 ml of dimethylacetamide. The stirring solution is heated under nitrogen, until all of the monomer is dissolved. To the stirring solution 5 ml of pyridine and 4.407 grams (0.022 moles) of terephthaloyl dichloride is added. Another 25 ml of dimethylacetamide is added. The clear, pale yellow solution's viscosity rapidly increases within the first five minutes. The solution is allowed to stir at 60° C. for three hours.

The polymer is worked up the same as in Example I, precipitating twice in water and twice in methanol. A typical batch of polymer was found to have an intrinsic viscosity of 0.84 at 25° C. in dimethylacetamide and a Tg of 303.08° C.

A 10% polymer solution is prepared in dimethylacetamide. The solution needs to be heated in order for the powder to dissolve. The solution is then filtered through a 10 micron filter to remove and particulate. The film is cast on a glass plate. Approximately 20 grams of solution is poured onto the glass plate in a 110 cm glass ring. The plate is then put into a vacuum oven set at 70° C. for twenty-four hours. The film is removed from the plate and put into another vacuum oven set at 250° for forty-eight hours. The dried film is kept in a desiccator until it is mounted in a permeation cell.

The dried film is placed into a Dow Permeability Cell. A vacuum is pulled on one side and a nitrogen head is on the other. After at least three days of equilibrating the nitrogen permeability measurement is taken. The system is then purged with oxygen and allowed to equilibrate again before taking the oxygen measurement. The results are as follows:
P(O$_2$)=5.43
P(N$_2$)=0.89
αO$_2$/N$_2$=6.13.

EXAMPLE IV

Polyamide membranes were made in accordance with the present invention having the structural formula:

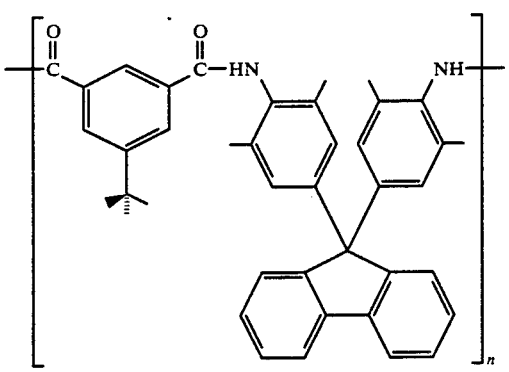
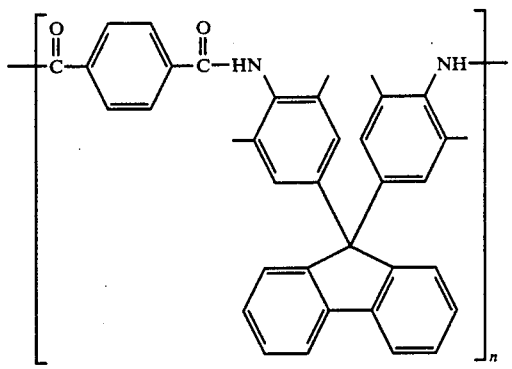

In an apparatus similar to Example I, the flask is charged with 7.806 grams (0.018 moles) of 9,9-bis(2,6-dimethyl-1-aminophenyl)fluorene and 50 ml of dimethylacetamide. The stirring solution is heated under nitrogen, until all of the monomer is dissolved. To the stirring solution 5 ml of pyridine and 5 grams (0.018 moles) of t-butyl-isophthaloyl dichloride is added. Another 25 ml of dimethylacetamide is added. The clear, pale yellow solution's viscosity rapidly increases within the first five minutes. The solution is allowed to stir at 60° C. for three hours.

The polymer is worked up the same as in Example I, precipitating twice in water and twice in methanol.

A 10% polymer solution is prepared in dimethylacetamide. The solution needs to be heated in order for the powder to dissolve. The solution is then filtered through a 10 micron filter to remove and particulate. The film is cast on a glass plate. Approximately 20 grams of solution is poured onto the glass plate in a 110 cm glass ring. The plate is then put into a vacuum oven set at 70° C. for twenty-four hours. The film is removed from the plate and put into another vacuum oven set at 250° for forty-eight hours. The dried film is kept in a desiccator until it is mounted in a permeation cell.

The dried film is placed into a Dow Permeability Cell. A vacuum is pulled on one side and a nitrogen head is on the other. After at least three days of equilibrating the nitrogen permeability measurement is taken. The system is then purged with oxygen and allowed to equilibrate again before taking the oxygen measurement. The results are as follows:

$P(O_2) = 7.97$
$P(N_2) = 1.42$
$\alpha O_2/N_2 = 5.63$.

EXAMPLE V

Thin film polyamide membranes were made in accordance with the procedure set out below. These polyamide membranes had the general structural formula:

A four neck 500 ml reaction kettle, equipped with a mechanical stirrer, $N_2$ inlet, and glass funnel, is charged with 9.9632 grams (0.025 moles) of 9,9-bis(2,6-dimethyl-1-aminophenyl)fluorene and 50 ml of dimethylacetamide. The solution is heated, under nitrogen, until the monomer dissolves. To the stirring solution 10 ml of pyridine and 5 grams (0.025 moles) of isophthaloyl dichloride is added. An additional 25 grams of dimethylacetamide is added. The resultant clear, yellow solution rapidly increases in viscosity during the first five minutes. The solution is heated to at least 80° C. for three hours.

The polymer is worked up by precipitating it in water. The polymer is then redissolved in dimethylacetamide (heating of the solution is required) and reprecipitated again into water. The polymer is then redissolved and reprecipitated in methanol twice. The resulting white powder is dried under vacuum at 80° C. for twenty-four hours. One typical batch of polymer was found to have an intrinsic viscosity of 0.376 at 25° C. in dimethylacetamide and a Tg of 436.57° C.

A 10% polymer solution is prepared in dimethylacetamide. The solution needs to be heated in order for the powder to dissolve. The solution is then filtered through a 10 micron filter to remove particulates. The film is cast on a glass plate. Approximately 20 grams of solution is poured onto the glass plate in a 110 cm glass ring. The plate is then put into a vacuum oven set at 70° C. for twenty-four hours. The film is removed from the plate and put into another vacuum oven set at 250° for forty-eight hours. The dried film is kept in a desiccator until it is mounted in a permeation cell.

The dried film is placed into a Dow Permeability Cell. A vacuum is pulled on one side and a nitrogen head is on the other. After at least three days of equilibrating the nitrogen permeability measurement is taken. The system is then purged with oxygen and allowed to equilibrate again before taking the oxygen measurement. The results are as follows:

$P(O_2) = 3.10$
$P(N_2) = 0.46$
$\alpha O_2/N_2 = 6.79$.

Having thus described the present invention, what is now deemed appropriate for Letters Patent is set out in the following appended claims.

What is claimed is:

1. A semi-permeable membrane formed from a polyamide containing polymerizable units of the formula:

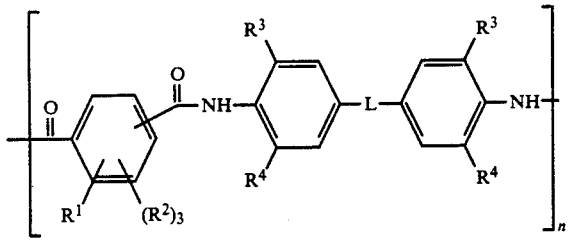

wherein $R^1$ is H or a $C_1$–$C_4$ alkyl group,
each $R^2$ is independently H or a methyl group,
$R^3$ is a methyl group,
$R^4$ is a methyl, ethyl or isopropyl group,
L is a bicyclo bridging group or

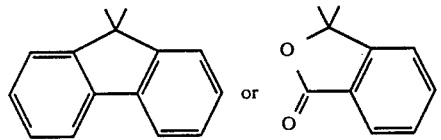

and n is an integer greater than 50.

2. A membrane in accordance with claim 1 wherein L is

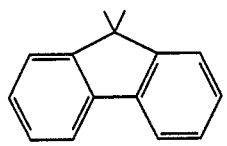

3. A membrane in accordance with claim 2 wherein $R^1$ and $R^2$ or H, $R^3$ is methyl and $R^4$ is isopropyl.

4. A membrane in accordance with claim 2 wherein $R^1$ and $R^2$ are H and $R^3$ and $R^4$ are methyl.

5. A membrane in accordance with claim 1 wherein $R^1$ and $R^2$ are H, $R^3$ is methyl and $R^4$ is isopropyl.

6. A membrane in accordance with claim 1 wherein $R^1$ and $R^2$ are H and $R^3$ and $R^4$ are methyl.

7. A membrane in accordance with claim 1 wherein L is a bicyclo bridging group having the structural formula:

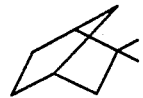

8. A membrane in accordance with claim 1 wherein L is a fused ring bicyclo bridging group.

9. A membrane in accordance with claim 8 wherein said fused ring bicyclo bridging group is selected from the group consisting of:

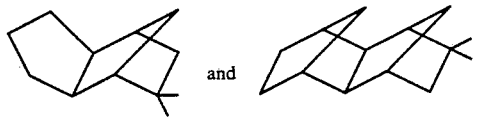

10. A process for separating a component of a gas mixture containing at least one other component, said process comprising: bringing said gas mixture into contact with the membrane of claim 1 which is selectively permeable toward one component of said gas mixture, whereby said component selectively permeates through said membrane from a feed side having a higher partial pressure of said component to a permeate side having a lower partial pressure of said component.

11. A process in accordance with claim 10 wherein the gas mixture is air and oxygen selectively permeates through the membrane.

12. A process in accordance with claim 10 wherein the gas mixture contains nitrogen and oxygen.

* * * * *